US007916649B2

(12) United States Patent
Buvaneswari et al.

(10) Patent No.: US 7,916,649 B2
(45) Date of Patent: Mar. 29, 2011

(54) APPARATUS AND METHOD FOR MONITORING AND ANALYSIS OF COMMUNICATION OVER A WIRELESS NETWORK

(75) Inventors: Arumugam Buvaneswari, Piscataway, NJ (US); John Martin Graybeal, Califon, NJ (US); Mark Haner, Westfield, NJ (US); Bhanumathi Ravishankar, Karnataka (IN); George E. Rittenhouse, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1343 days.

(21) Appl. No.: 10/952,908

(22) Filed: Sep. 30, 2004

(65) Prior Publication Data
US 2006/0084429 A1 Apr. 20, 2006

(51) Int. Cl.
*G01R 31/08* (2006.01)
(52) U.S. Cl. ........ 370/241; 370/235; 370/252; 455/423; 455/424; 455/522
(58) Field of Classification Search .................. 370/535, 370/241, 252; 455/439, 67.1, 423, 424, 447, 455/446, 561, 560, 428, 435, 426, 453
See application file for complete search history.

(56) References Cited

U.S. PATENT DOCUMENTS

| 6,137,782 | A | * | 10/2000 | Sharon et al. | 370/255 |
|---|---|---|---|---|---|
| 6,157,838 | A | * | 12/2000 | Di Huo et al. | 455/439 |
| 2002/0075906 | A1 | * | 6/2002 | Cole et al. | 370/535 |
| 2004/0033816 | A1 | * | 2/2004 | Semper et al. | 455/561 |
| 2004/0121770 | A1 | * | 6/2004 | Tigerstedt et al. | 455/436 |
| 2004/0199579 | A1 | * | 10/2004 | Straw | 709/204 |
| 2005/0031097 | A1 | * | 2/2005 | Rabenko et al. | 379/93.31 |
| 2005/0278437 | A1 | * | 12/2005 | Xie et al. | 709/223 |
| 2006/0238332 | A1 | * | 10/2006 | Carle et al. | 340/539.1 |
| 2008/0076572 | A1 | * | 3/2008 | Nguyen et al. | 463/42 |

* cited by examiner

*Primary Examiner* — Ricky Ngo
*Assistant Examiner* — David Oveissi
(74) *Attorney, Agent, or Firm* — Harness, Dickey & Pierce, P.L.C.

(57) ABSTRACT

In the method for monitoring communication in a wireless communication network, a network explorer may be passively attached to the wireless communication network. The network explorer may store data associated with received communication over the wireless communication network and performs an analysis on the stored data. In the apparatus of the network explorer may passively monitor communication over a wireless communication network, store data associated with the communication, and perform an analysis on the stored data.

29 Claims, 4 Drawing Sheets

Figure 4

| CallSummary# | CCU | CE | CALLID | IncomingState | EndingState | InitialPath | ESN | ServiceOptionRequested | ServiceOptionAssigned | FwdRadioCfg | ReleaseReason | CallSegmentStartTime_sec | CallSegmentEndTime_sec | TotalCallSegmentDuration_sec |
|---|---|---|---|---|---|---|---|---|---|---|---|---|---|---|
| 0 | 0x0003 | 0x0011 | 0x02a2 | SOFT_HANDOFF | NOT_A_HANDOFF | 2 | 0x51e3b4d6 | 0x6000 | 0x0003 | 3 | 0 | 1.45 | 3.9 | 2.45 |
| 1 | 0x0003 | 0x0005 | 0x0029 | SOFT_HANDOFF | PRIMARY_TRANSFER_SOFT | 1 | 0xf70f002b | 0x0003 | 0x0003 | 3 | 0 | 3.99 | 5.47 | 1.48 |
| 2 | 0x0003 | 0x0030 | 0x02f1 | NOT_A_HANDOFF | NOT_A_HANDOFF | 0 | 0xf7d2b238 | 0x0003 | 0x0003 | 3 | 0 | 2.7 | 6.8 | 4.1 |
| 3 | 0x0002 | 0x0039 | 0x0095 | UNKNOWN | NOT_A_HANDOFF | 0 | 0x00000000 | 0x0000 | 0x0000 | 0 | 0 | 0 | 6.9 | 6.9 |
| 4 | 0x0001 | 0x0007 | 0x02f1 | SOFT_HANDOFF | NOT_A_HANDOFF | 2 | 0xf797a206 | 0x6000 | 0x0003 | 3 | 0 | 1.47 | 7.44 | 5.97 |
| 5 | 0x0003 | 0x002a | 0x0177 | NOT_A_HANDOFF | NOT_A_HANDOFF | 2 | 0xf7d2b238 | 0x0003 | 0x0003 | 3 | 0 | 8.1 | 12.03 | 3.93 |
| 6 | 0x0001 | 0x0008 | 0x01e6 | SOFT_HANDOFF | NOT_A_HANDOFF | 1 | 0x3f15beb6 | 0x6000 | 0x0003 | 3 | 0 | 4.27 | 12.98 | 8.71 |
| 7 | 0x0001 | 0x000e | 0x0033 | SOFT_HANDOFF | NOT_A_HANDOFF | 1 | 0x3cdab1de | 0x0003 | 0x0003 | 3 | 0 | 8.43 | 15.92 | 7.49 |
| 8 | 0x0002 | 0x0005 | 0x00a5 | SOFT_HANDOFF | NOT_A_HANDOFF | 1 | 0xf7df002b | 0x0003 | 0x0003 | 3 | 0 | 9.65 | 16.52 | 6.87 |
| 9 | 0x0000 | 0x0000 | 0x01ec | SOFT_HANDOFF | NOT_A_HANDOFF | 2 | 0x51e3b4d6 | 0x6000 | 0x0003 | 3 | 0 | 11.44 | 17.34 | 5.9 |
| 10 | 0x0000 | 0x0020 | 0x0254 | NOT_A_HANDOFF | NOT_A_HANDOFF | 0 | 0xf7d2b238 | 0x0003 | 0x0003 | 3 | 0 | 13.69 | 17.76 | 4.07 |
| 11 | 0x0001 | 0x0018 | 0x0248 | SOFT_HANDOFF | NOT_A_HANDOFF | 0 | 0x2949d7c8 | 0x0003 | 0x0003 | 3 | 0 | 5.81 | 17.82 | 12.01 |
| 12 | 0x0000 | 0x0008 | 0x028a | PRIMARY_TRANSFER_SOFT | NOT_A_HANDOFF | 1 | 0x3f15beb8 | 0x6000 | 0x0003 | 3 | 0 | 14.7 | 19.31 | 4.61 |
| 13 | 0x0001 | 0x002a | 0x0100 | SOFT_HANDOFF | NOT_A_HANDOFF | 1 | 0x3f16b963 | 0x0003 | 0x0003 | 3 | 0 | 1.83 | 19.54 | 17.71 |
| 14 | 0x0000 | 0x0024 | 0x0318 | NOT_A_HANDOFF | NOT_A_HANDOFF | 0 | 0xf7d2b238 | 0x0003 | 0x0003 | 3 | 0 | 19.09 | 22.9 | 3.81 |
| 15 | 0x0003 | 0x0022 | 0x013c | SOFT_HANDOFF | NOT_A_HANDOFF | 0 | 0x24b0b9c | 0x6000 | 0x0003 | 3 | 0 | 19.78 | 25.12 | 5.34 |
| 16 | 0x0000 | 0x0009 | 0x0047 | SOFT_HANDOFF | NOT_A_HANDOFF | 0 | 0xf7d2b16 | 0x0003 | 0x0003 | 3 | 0 | 17 | 26.74 | 9.74 |
| 17 | 0x0000 | 0x0001 | 0x0183 | SOFT_HANDOFF | NOT_A_HANDOFF | 2 | 0x51bcd71 | 0x6000 | 0x0003 | 3 | 0 | 11.46 | 27.9 | 16.44 |
| 18 | 0x0000 | 0x0023 | 0x02fb | SOFT_HANDOFF | NOT_A_HANDOFF | 1 | 0x2b0b623d | 0x0003 | 0x0003 | 3 | 0 | 18.18 | 28.12 | 9.94 |
| 19 | 0x0002 | 0x0011 | 0x010b | UNKNOWN | PRIMARY_TRANSFER_SOFT | 0 | 0x00000000 | 0x0000 | 0x0000 | 0 | 0 | 0 | 28.17 | 28.17 |
| 20 | 0x0001 | 0x001b | 0x0065 | UNKNOWN | NOT_A_HANDOFF | 1 | 0xf70f002b | 0x0003 | 0x0003 | 3 | 0 | 0 | 29.46 | 29.46 |
| 21 | 0x0000 | 0x000c | 0x02ac | SOFT_HANDOFF | NOT_A_HANDOFF | 1 | 0xf7d2b238 | 0x6000 | 0x0003 | 3 | 0 | 26.2 | 29.5 | 3.3 |
| 22 | 0x0003 | 0x0031 | 0x0346 | NOT_A_HANDOFF | NOT_A_HANDOFF | 0 | 0xf7d2b238 | 0x0003 | 0x0003 | 3 | 0 | 25.57 | 29.84 | 4.27 |
| 23 | 0x0000 | 0x000a | 0x0072 | SOFT_HANDOFF | NOT_A_HANDOFF | 2 | 0x51e3b4d6 | 0x6000 | 0x0003 | 3 | 0 | 18.82 | 30 | 11.18 |
| 24 | 0x0000 | 0x000b | 0x0044 | SOFT_HANDOFF | NOT_A_HANDOFF | 1 | 0x3cda91de | 0x6000 | 0x0003 | 3 | 0 | 23.28 | 31.4 | 8.12 |
| 25 | 0x0000 | 0x0025 | 0x02df | SOFT_HANDOFF | NOT_A_HANDOFF | 1 | 0x3f15beb8 | 0x6000 | 0x0003 | 3 | 0 | 29.14 | 33.42 | 4.28 |
| 26 | 0x0000 | 0x0037 | 0x0263 | NOT_A_HANDOFF | NOT_A_HANDOFF | 0 | 0xf7d2b238 | 0x6000 | 0x0003 | 3 | 0 | 31.15 | 35.18 | 4.03 |
| 27 | 0x0000 | 0x000e | 0x0261 | SOFT_HANDOFF | NOT_A_HANDOFF | 1 | 0x3f15beb8 | 0x6000 | 0x0003 | 3 | 1 | 30.1 | 36.1 | 6 |
| 28 | 0x0003 | 0x0001 | 0x007b | SOFT_HANDOFF | NOT_A_HANDOFF | 2 | 0xf7d00364 | 0x6000 | 0x0003 | 3 | 0 | 30.58 | 36.51 | 5.93 |
| 29 | 0x0002 | 0x0017 | 0x00cf | SOFT_HANDOFF | NOT_A_HANDOFF | 2 | 0xf72e3907 | 0x0021 | 0x0021 | 3 | 0 | 39.05 | 43.62 | 4.57 |
| 30 | 0x0002 | 0x003a | 0x0327 | UNKNOWN | PRIMARY_TRANSFER_SOFT | 0 | 0x00000000 | 0x0000 | 0x0000 | 0 | 0 | 0 | 45.6 | 45.6 |
| 31 | 0x0002 | 0x000f | 0x0098 | SOFT_HANDOFF | NOT_A_HANDOFF | 0 | 0xf70e4b59 | 0x0003 | 0x0003 | 3 | 0 | 9.67 | 50.84 | 41.17 |
| 32 | 0x0000 | 0x0025 | 0x02df | SOFT_HANDOFF | NOT_A_HANDOFF | 0 | 0x2949d7c8 | 0x0003 | 0x0003 | 3 | 0 | 23.44 | 51.8 | 28.36 |
| 33 | 0x0000 | 0x000e | 0x01c1 | SOFT_HANDOFF | PRIMARY_TRANSFER_SOFT | 2 | 0x3f153cc2 | 0x6000 | 0x0003 | 3 | 0 | 50.13 | 56.02 | 5.89 |
| 34 | 0x0002 | 0x000d | 0x013d | SOFT_HANDOFF | NOT_A_HANDOFF | 1 | 0x3f11609 | 0x0003 | 0x0003 | 3 | 0 | 51.39 | 56.25 | 4.86 |
| 35 | 0x0002 | 0x003a | 0x0258 | SOFT_HANDOFF | NOT_A_HANDOFF | 2 | 0x51ef453 | 0x0003 | 0x0003 | 3 | 0 | 15.34 | 56.75 | 41.41 |
| 36 | 0x0000 | 0x0011 | 0x0268 | SOFT_HANDOFF | NOT_A_HANDOFF | 1 | 0x3f16b963 | 0x6000 | 0x0003 | 3 | 0 | 36.7 | 57.19 | 20.49 |
| 37 | 0x0003 | 0x001d | 0x00a | SOFT_HANDOFF | NOT_A_HANDOFF | 0 | 0x38659959 | 0x0003 | 0x0003 | 3 | 0 | 8.07 | 57.52 | 49.45 |

APPARATUS AND METHOD FOR MONITORING AND ANALYSIS OF COMMUNICATION OVER A WIRELESS NETWORK

BACKGROUND OF THE INVENTION

1. Field of the Invention

The present invention relates generally to wireless communication networks, and more particularly to monitoring and analyzing communication over the network.

2. Description of the Related Art

For the foreseeable future, two very important market forces may continue in wireless communication networks: the increasing complexity of wireless network services, and the increasing customer demands and competitive pressures upon wireless service providers. Viewed from the perspective of the wireless service provider, these technical and economic trends are a potent combination.

The continued growth in network load and the addition of high-speed data services combine to make the network ever more difficult to monitor, trouble-shoot, and optimize using traditional tools alone. It is important to recognize that with the addition of wireless data services, the cell loading behavior has changed in statistically significant ways. Voice users are large in number and their per-mobile communication patterns are comparatively "smooth". Hence in a statistical sense, aggregate voice loading inherently is more self-averaging within a given cell. However data communication is much more "bursty" and the number of simultaneously served high-speed data users within a cell may be significantly smaller than for voice services. Hence fluctuations in data loading and performance are broader in character than for voice services. Additionally, data's different statistical characteristics and QOS (Quality of Service) requirements require entirely new network elements, with more complex signaling and control mechanisms throughout. Generally, these trends are apply to generic 3G wireless standards, and may be applied to any existing standard and/or future standard (i.e., these trends are not limited to CDMA2000).

The industry's challenging economic realities require service providers to continually seek avenues for shortening their time to revenue while simultaneously improving their provisioning and optimization abilities to extract the most network performance possible in order to prosper in an increasingly competitive marketplace. The collision of these technical and economic forces presents a clear challenge: to find mechanisms to achieve these economic efficiencies in the face of the growing network complexity.

Such methodologies tend to rely heavily on data regarding the performance of the network. Several network monitoring and performance monitoring techniques exist.

Traditional network Service Measurements (SMs) are typically averaged or accumulated over some measurement period, e.g., one hour. Such SMs are well suited to performance monitoring situations where the relevant quantity is deterministic and readily measurable, often associated with a particular network sub-element. An example might be the peak number of Walsh codes in use during the hour. As long as this peak demand does not exceed the maximum number of available codes, one can safely conclude that no performance degradation directly resulted. However, there also exist situations, which require comparisons or correlations between multiple quantities at a specific time within the measurement period, and these often require the SMs to be binned upon much finer time scales in order to draw statistically valid conclusions. Namely, there exist situations which require much more detailed knowledge regarding the full network state as a function of time. Two examples might be understanding and managing the interactions between simultaneous voice and data users on the same carrier, and gaining a deeper understanding regarding the confluence of events which can lead to lost calls.

Per-call service measurements are an important step along the path towards more detailed information on finer time scales, but they too have their limitations. Typically they retain only a subset of the system state and performance metrics, to avoid presenting an undue burden upon the network infrastructure.

Drive testing has long been an important tool for performance monitoring and diagnosis, and likely will continue for many years. However, there exist numerous situations where the actual user behavior is critical to understanding the network behavior and performance, something drive testing can at best only approximate. For example, data performance and provisioning are keenly dependent upon accurate packet data communication models, data user locations within the cell, the number and activity of simultaneous users, their mobility, etc. Drive testing is also relatively expensive, so collecting detailed performance data from actual user mobiles provides an important opportunity for cost reduction.

SUMMARY OF THE INVENTION

In the wireless network explorer of the present invention, communication on a wireless network may be passively monitored and analyzed such that no load is added to the wireless network. The wireless network explorer may include a plurality of state machines for responding to given elements within the received communication. Call characteristics associated with the received communication may be stored in a database for later analysis.

In one embodiment, the aggregate information compiled in the database may be analyzed to perform mobile location and propagation loss analysis on received communication. In another embodiment, a temporal analysis may be performed on various stored call characteristics within the database.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 4 illustrates an example of data queried and organized by the feature extractor of FIG. 2.

DETAILED DESCRIPTION OF THE INVENTION

Figure 1:
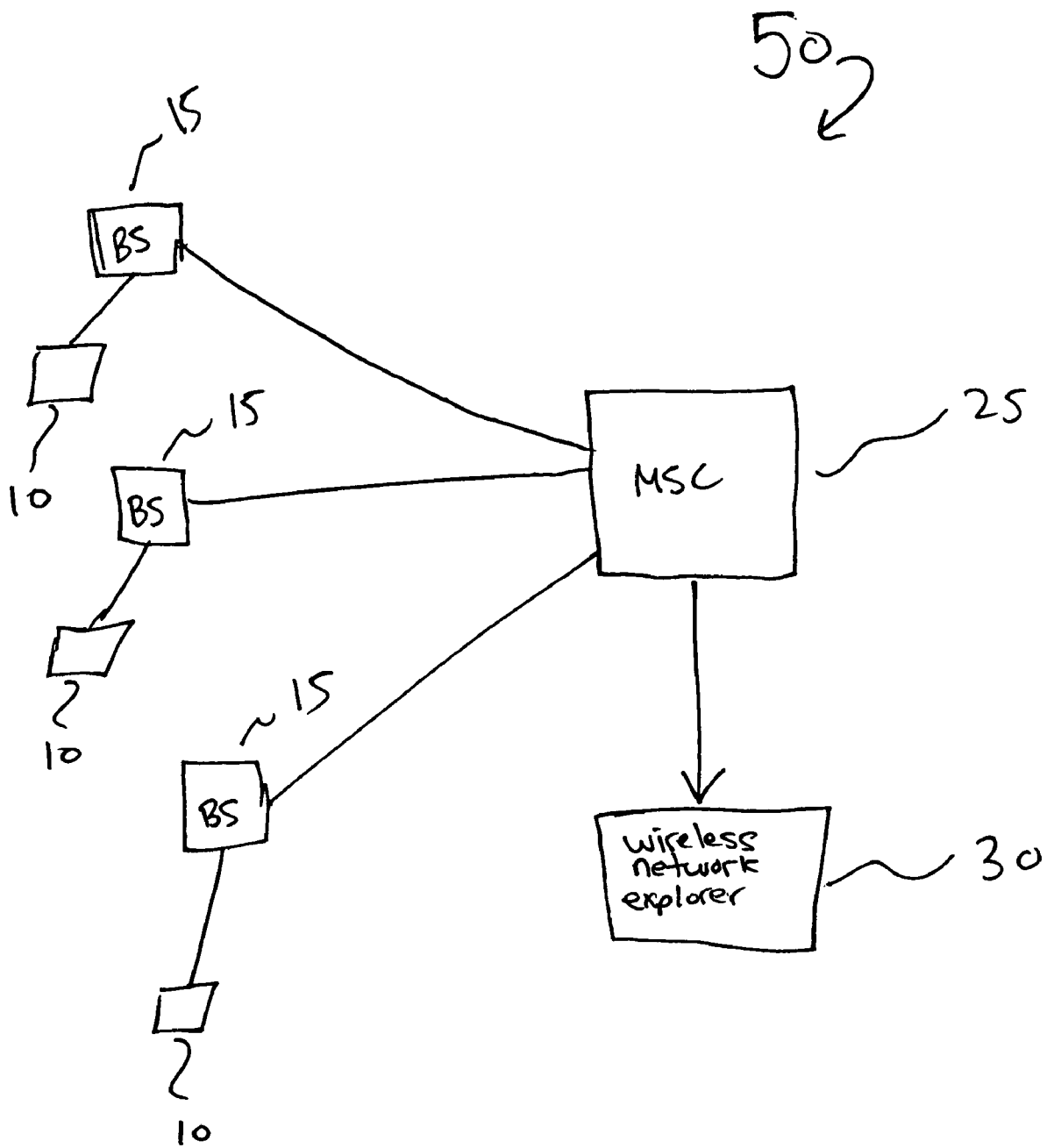
FIG. 1 illustrates the network architecture of a wireless network according to an exemplary embodiment of the present invention.

FIG. 1 illustrates the network architecture of a wireless network 50 according to an exemplary embodiment of the present invention. As shown, mobile stations (MS) 10 (e.g., cell phones, wireless equipped laptops, PDAs, etc.) may communicate with respective base stations (BS) 15 in both an uplink (i.e., to the base station) and a downlink (i.e., from the base station) direction. The BSs 15 may also communicate with their respective mobile switch center (MSC) 25 over a backhaul. In wireless network technology, the backhaul is a connection to transmit voice and data traffic between a remote-sited transmitter/receiver (e.g., BS) and its destination (e.g., a central site such as a MSC). The communication may include at least one of a voice communication and/or a data communication. In the case of voice, the MSC 25 may connect voice calls with other MSCs or with a wireline network such as the public telephone switch network (PTSN). In the case of data, the MSC 25 may provide the connection to the inter-working function (IWF) (or packet control function (PCF) and packet data server node (PDSN)), after which the packets are routed to an the appropriate destination. Apart from switching, the MSC 25 provides diagnostic information and billing statistics.

In an exemplary embodiment of the present invention, a wireless network explorer 30 may monitor the link between at least one BS 15 and the MSC 25. The wireless network explorer 30 may be connected to the MSC 25 as illustrated in FIG. 1. The wireless network explorer 30 may receive input from the MSC 25 via an access point of the backhaul of the MSC 25. The connection of the wireless network explorer 30 to the MSC 25 via the backhaul is passive and does not affect and/or interfere with the performance of the wireless network 50.

The wireless network explorer 30 may be configured to monitor the carriers of at least one of the BSs 15. For example, two BSs 15 may reside within a geographical range of interest to a system analyst. In this example, it may be preferable to analyze each of the two BSs 15 within the geographical range of interest. Alternatively, the system designer may focus on a single BS 15.

Figure 2:
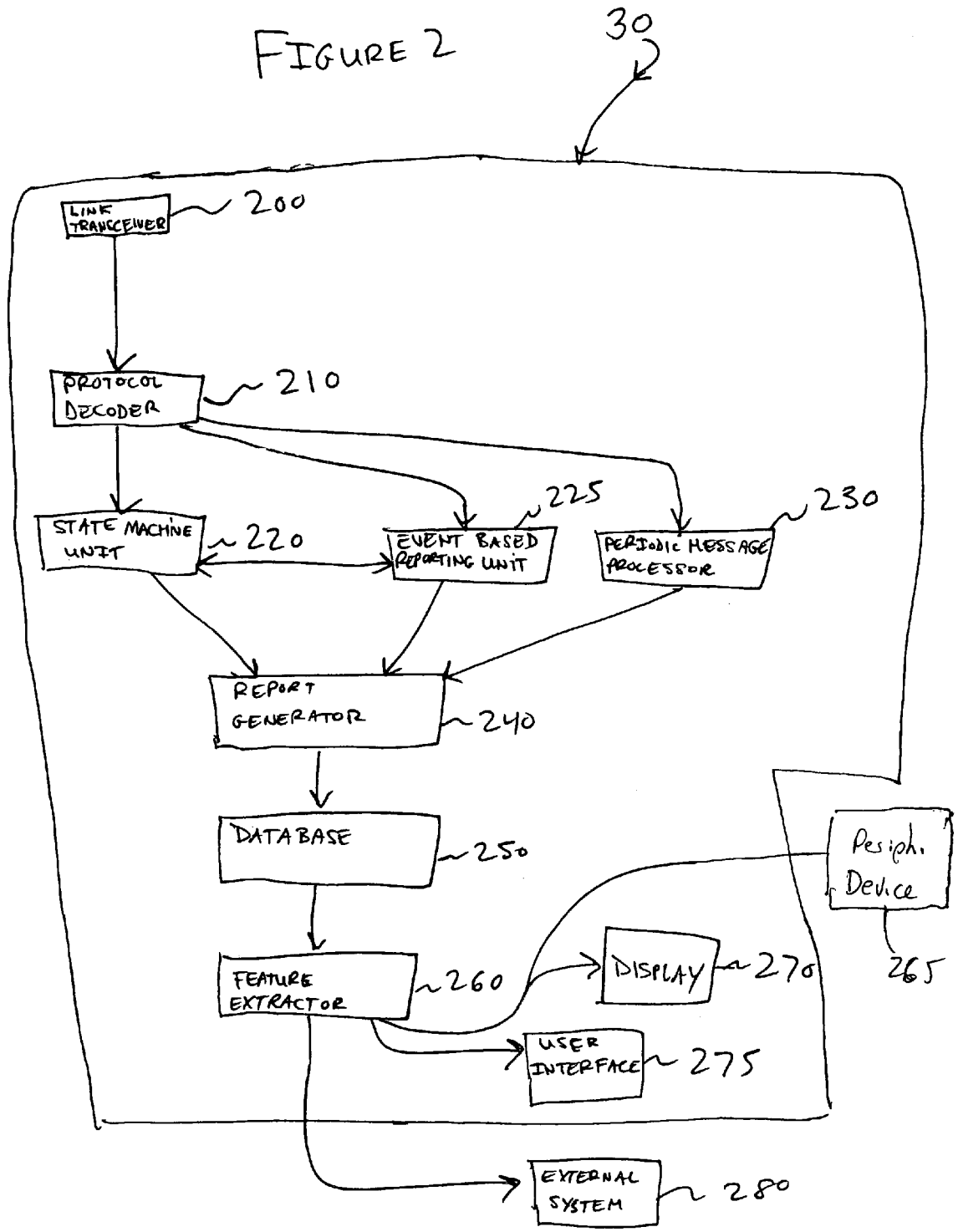
FIG. 2 illustrates a block diagram of the wireless network explorer for monitoring and analyzing communication on a wireless network according to an exemplary embodiment of the present invention.

FIG. 2 illustrates a block diagram of the wireless network explorer 30 for monitoring and analyzing communication on the wireless network 50 according to an exemplary embodiment of the present invention. The wireless network explorer 30 may include link transceivers 200 (e.g. T1/E1 transceivers) to parse data from the voice/data packets transmitted on the backhaul between the MSC 25 and one or more BSs 15.

In another exemplary embodiment of the present invention, the wireless network explorer 30 may include a processor board connected to a chassis of the MSC 25, thereby enabling a capture of messaging between the MSC 25 and the BSs 15. In this embodiment, software for the wireless network explorer 30 may be executed on the processor board.

The wireless network explorer 30 may include a protocol decoder 210 for parsing the different types of messages received from the link transceivers 200. These messages may include, but are not limited to, control messages between the MSC 25 and the BS 15, traffic frames between the MSC 25 and the BS 15, soft hand-off messages relayed between BSs 15, reverse link mobile signaling messages, forward link mobile signaling messages, aggregated BS 15 loading reports, etc.

Figure 3:
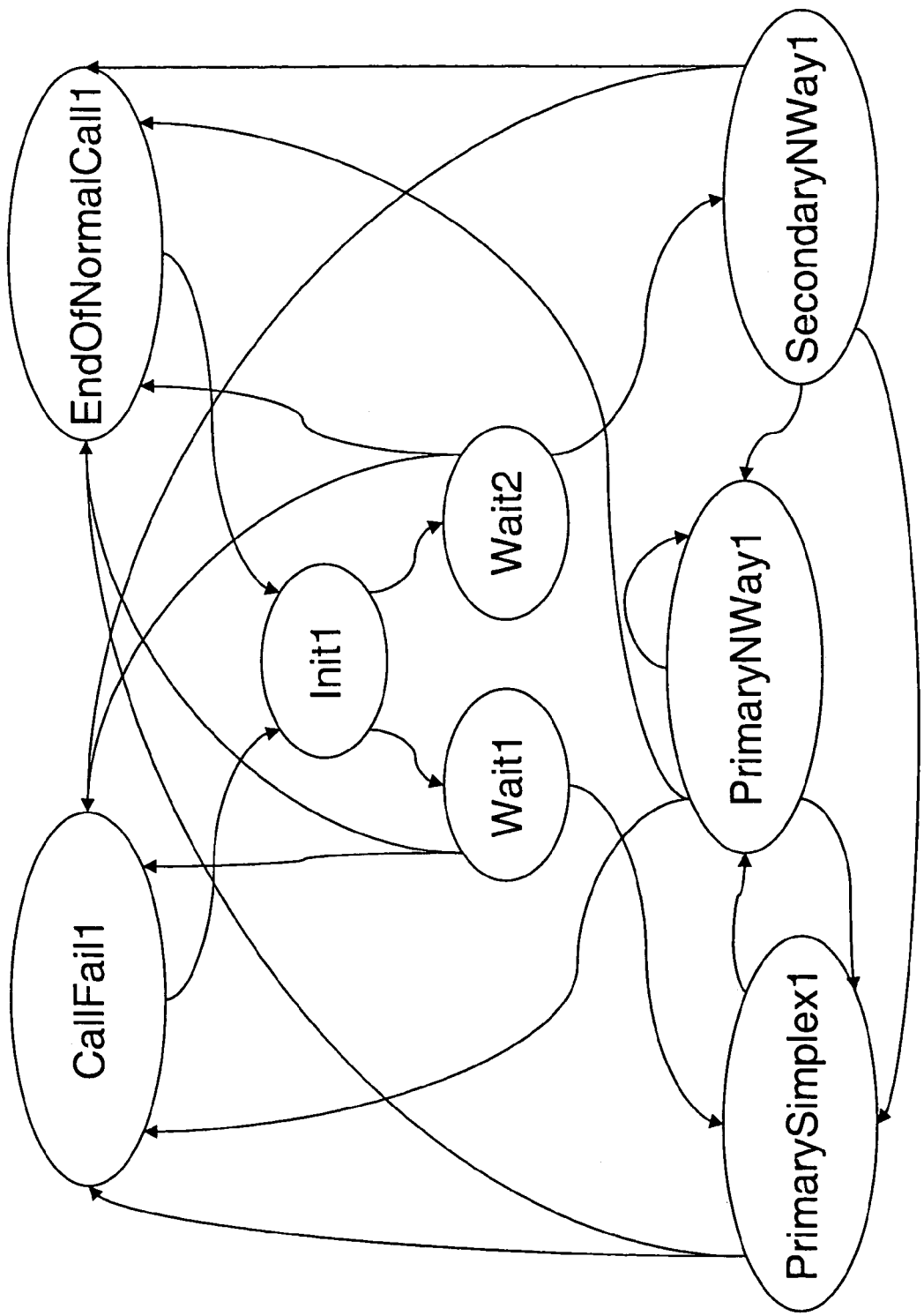
FIG. 3 illustrates one exemplary embodiment of a state machine unit.

The wireless network explorer 30 may include a state machine unit 220, the state machine unit 220 runs a state machine for each monitored call based on the data parsed by the protocol decoder 210. FIG. 3 illustrates one exemplary embodiment of a state machine unit 220.

A state machine is created for a call when either a call origination message is received or a secondary handoff request is received. If the state machine unit 220 determines that a call origination message is received, the state machine unit 220 transitions the state machine from a first initial state Init1 to a first waiting state Wait1. If the state machine unit 220 determines that a secondary handoff request is received, the state machine unit 220 transitions the state machine from the first initial state Init1 to a second waiting state Wait2.

Call Origination Message

An exemplary embodiment of the present invention will now be described wherein the state machine unit 220 receives a call origination (e.g., from a mobile station or a network) message while in the first initial state Init1. As described above, the state machine unit 220 transitions the state machine to the first waiting state Wait1 upon receipt of the call origination message. In the first waiting state Wait1, the state machine unit 220 records the elements listed below in Table 1 with respect to the call.

In another exemplary embodiment of the present invention, whenever the state machine unit 220 records any element associated with the call, the location of the mobile station, which is within the analyzed wireless communication, and a time stamp associated with the call characteristic being stored (e.g., in the case of a call origination message, the time at which the mobile station began the call would be recorded in the time stamp) are also recorded with the associated element.

TABLE 1

| Element | Examples |
| --- | --- |
| Parameters associated with the received message and the mobile station from which the message was received. | ESN/ID of the mobile station<br>Cell site<br>Carrier handling the call<br>Sector handling the call<br>Signature of the hardware element that is handling the call<br>A requested service option<br>  i. Voice<br>  ii. Data<br>  iii. Facsimile<br>The radio configuration (RC)<br>  i. RC-1<br>  ii. RC-2<br>  iii. RC-3<br>  iv. RC-4<br>  v. RC-5<br>The incoming state of the mobile station<br>  i. Fast moving<br>  ii. Slow moving |

The first waiting state Wait1 transitions to a call failure state CallFail1 when a call processing/release failure message is received, and the state machine unit 220 records the elements listed below in Table 2 with respect to the call.

TABLE 2

| Element | Description | Examples |
| --- | --- | --- |
| Call blocks and associated information | Information that indicates the call origination attempts are blocked due to resource limitations | Cell hardware<br>Radio link<br>MSC hardware<br>Backhaul<br>Walsh code |
| Ineffective call attempts and associated information | Information that indicates that call attempts become ineffective due to various reasons | Acquiring a mobile in a traffic channel<br>Service option connection |
| Data Specific Quality of Service (QOS) problem. | Information that indicates a QOS problem. | Denied data channel<br>Burst delay |

Alternatively, the first waiting state Wait1 transitions to a primary simplex call state PrimarySimplex1 when a traffic channel confirmation message is received. In the primary simplex call state PrimarySimplex1, the base station that is being monitored is the primary base station for the call and has the only leg that is handling the call (i.e., the call is not in soft handoff).

In the primary simplex call state PrimarySimplex1, if a call release message is received, the state machine unit 220 transitions the state machine to an end of normal call state EndOfNormalCall1. Alternatively, the state machine unit 220 transitions the state machine to the call failure state CallFail1 when a call processing/release failure message is received.

Further, in the primary simplex call state PrimarySimplex1, if a handoff direction message is received (i.e., a message indicating that the call is in a soft handoff with at least 2 sectors), the primary simplex call state PrimarySimplex1 transitions to a primary N-way call state PrimaryNWay1.

The state machine remains in the primary N-way call state PrimaryNWay1 until one of a call release message, a call setup failure message, and a handoff removal message resulting in only one leg (i.e., one BS) handling a call (e.g., a handoff removal message indicating that the call is still in soft handoff with at least two legs would not qualify) is received. When the call release message is received, the state machine transitions to the end of normal call state EndOfNormalCall1. When the call setup failure message is received, the state machine transitions to the call failure state CallFail1. When the handoff removal message resulting in only one leg handling the call is received, the state machine transitions back to the primary simplex call state PrimarySimplex1. When a handoff removal message is received which results in at least two legs handling the call is received, the state machine remains in the primary N-way call state PrimaryNWay1.

In the states PrimarySimplex1 and/or PrimaryNWay1, the state machine unit 220 records the elements listed below in Table 3 for the call.

TABLE 3

| Element | Description | Examples |
| --- | --- | --- |
| Handoff triggers | Handoff triggers are messages sent by the mobile when the strength of the pilots in the active, candidate and neighbor sets exceed or drop below a given static or dynamic threshold. In response to the handoff triggers, the core network may instruct the mobile to add a pilot, drop a pilot, or take no action. Effective management of handoff triggers may reduce a number of call drops and/or increase network capacity. | pilot PN strength and arrival time of the active set strength and arrival time of the candidate set the round trip time of the message $E_b/N_o$ and $E_c/I_o$ loss metric at the primary leg |
| Active set | | the pilot PN handling the call the leg add time type of handoff (e.g., soft or softer) |
| Trace of handoff legs | all pilots that were handling the call throughout the span of the call | leg remove time leg add time |
| Forward transmitted gain in radio configuration (RC) 1-calls | The gain values of control signals sent by the primary leg to the secondary legs. The gain values may be interpolated using the base station forward power control algorithm | gain values |
| voice traffic type | Frame rate and whether erasure or not. | full half quarter eighth |
| Reverse frame erasure rate (RFER) | The frame erasure rate (FER) on the reverse direction is based on the "selected reverse traffic type" as sent on the forward direction. | Average RFER Instantaneous RFER |
| Selected leg in each frame in the reverse direction | The frame selector is located at the MSC and in every forward frame, the MSC sends the selected leg information to all the legs handling the call. | Leg identifier |
| Forward frame erasure report | The forward frame erasure report calculation is based on the power measurement report (PMRM) message from the mobile for calls in soft handoff. | See PSMM below |
| Pilot strength measurement message (PSMM) | The mobile sends PSMM to the base station based on active and candidate set pilot activity as well as periodically if ordered by the primary cell. | Signal strength Arrive time |
| Layer-3 forward mobile signaling messages | All types of mobile signaling messages may be recorded for analysis | General/Universal Handoff Direction message (GHDM/UHDM) Extended supplemental channel assignment message (ESCAM) Neighbor list message System parameters message Alert with info message |
| 3G1x forward and reverse supplemental channel (SCH) | Characteristics of the forward and reverse SCH (i.e., the data activity) | Setup time Duration Rate (2x/4x/8x/16x) Backlog (at MSC for forward burst) Data burst aborts Anchor cell ID (forward burst) Anchor Transfer Diversity offset |

TABLE 3-continued

| Element | Description | Examples |
| --- | --- | --- |
| | | Characteristics of the data call/burst<br>i. RLP single/double<br>ii. MUX PDU<br>iii. QOS class<br>iv. QOS level |
| SCH denials and associated information | If the SCH is denied by the cell or by the MSC, the event is reported along with an approximate reason. | Cell hardware limit<br>Backhaul limit<br>RF limit<br>MSC limit<br>Walsh code limit |
| Radio Link Protocol (RLP) level details | RLP is a NAK based layer-2 protocol that is used on the radio link for data calls. | Round trip time (RTT) at the RLP layer<br>Retransmission percentage<br>Reason for retransmission<br>Reason for idle timeouts |
| Assigning a service option | A service option is assigned to a call based on a service option request. | Voice<br>Data<br>Facsimile |

In the call failure state CallFail1, the reason or reasons for the call failure are recorded by the state machine unit 220. The state machine unit 220 outputs the stored information associated with the call to a report generator 240. The state machine unit 220 transitions the state machine back to the initial state Init1 after the information is output. This ends the state machine for that call.

In the end of normal call state EndOfNormalCal, the state machine unit 220 records the mobility class of the call (i.e., the state of the call when the call ends) and details of the primary transfer (i.e., the base station ID of both the new and old primary BS and the active set before and after primary transfer). The state machine unit 220 outputs the stored information associated with the call to the report generator 240. The state machine transitions back to the initial state init1 after the information is recorded and output. This ends the state machine for that call.

Secondary Handoff Request

An exemplary embodiment of the present invention will now be described wherein the state machine unit 220 receives a secondary handoff request message. As described above, the state machine unit 220 establishes a state machine in the first initial state Init 1 and transitions the state machine to the second waiting state Wait2 upon receipt of the secondary handoff request. In the second waiting state Wait2, the state machine 220 records the elements listed above in Table 1 for the call.

The second waiting state Wait2 transitions to the call failure state CallFail1 when a call setup failure message is received, and the state machine unit 220 records the elements listed above in Table 2 for the call. The second waiting state Wait2 transitions to the state EndOfNormalCall1 when the call release message is received, and the state machine unit 220 records the elements listed above in Table 2 for the call.

Alternatively, the second waiting state Wait2 transitions to a secondary call N-way state SecondaryCallNWay when a secondary handoff acknowledgment message (SHAM) is received. In the secondary call N-way state SecondaryCallNWay, the base station that is being monitored handles the call as a secondary base station; namely, the call is being handled by some other base station as the primary base station.

In the state SecondaryCallNWay, the elements above-described in table 3 except for the handoff triggers are recorded. In the state SecondaryCallNway, the state machine transitions to the state PrimaryCallNWay when a primary transfer message is received resulting in more than one leg (i.e., BS) handling the call (i.e., the call enters soft handoff). If the state machine unit 220 receives a secondary call handoff direction message (i.e., a message indicating an addition or removal of sectors) with the call being handled by the same or different primary base station, the state machine remains in the state SecondaryCallNway. When the call release message is received, the state machine transitions to the end of normal call state EndOfNormalCall1. When the call setup failure message is received, the state machine transitions to the call failure state CallFail1. Alternatively, the state machine transitions to the state PrimarySimplex1 when the received primary transfer message results in only one leg (i.e., BS) handling the call (i.e., the mobile station is not in soft handoff).

The wireless network explorer 30 may include an event based reporting unit 225. The event based reporting unit 225 may receive and analyze incoming communication from the backhaul and determine whether given events (e.g., call release, anchor transfer, RLP retransmission, 3GX1 data burst setup, etc. . . . ) have occurred in calls within the wireless network 50. If one of the given events is found at the event based reporting unit 225, then the one of the given events may be sent to the report generator 240 along with the state of the call. The given events may include the elements listed below in Table 4 for the call.

In another exemplary embodiment of the present invention, the state machine unit 220 also records the elements listed below in Table 4 for the call when the state machine is in the SecondaryCallNWay, PrimarySimplex1 or PrimaryCallNWay states.

In another exemplary embodiment of the present invention, the recorded elements stored at the state machine unit 220 during the execution of the state machine are sent to the report generator 240 after the end of a monitored call (i.e., after either of states CallFail1 and/or EndOfNormalCall1).

TABLE 4

| Received message | Reported Information |
| --- | --- |
| Handoff Trigger | pilot PN<br>strength and arrival time of the active set<br>strength and arrival time of the candidate set<br>the round trip time of the message<br>Eb/No and Ec/Io loss metric at the primary leg |
| SCH setup, denial, abort and | Setup time<br>Duration |

TABLE 4-continued

| Received message | Reported Information |
| --- | --- |
| release | Rate (2x/4x/8x/16x) |
| | Backlog (at MSC for forward burst) |
| | Data burst aborts |
| | Diversity offset |
| | Reason for SCH failure |
| | i. Cell hardware limit |
| | ii. Backhaul limit |
| | iii. RF limit |
| | iv. MSC limit |
| | v. Walsh code limit |
| Anchor setup, release and transfer | Anchor cell ID (forward burst) |
| | Anchor transfer and reason |
| | Whether an active burst was aborted due to a transfer |
| RLP frames (e.g., RLP control frames) | Round trip time (RTT) at the RLP layer |
| | Retransmission percentage |
| | Timing of negative ACKs and retransmission |
| | Timing of idle timeouts |

A report generator 240 receives the outputs as described above from the state machine unit 220 and generates event triggered and periodic reports based on the received outputs. Event reporting may be triggered by information received from the state machine unit 220 and/or the event based reporting unit 225.

In addition to events triggering a report in the report generator 240, periodic reports based on communication conditions in the wireless communication network 50 may be scheduled in the periodic message processor 230. The periodic reports are based on communication between the MSC 25 and the BS 15 related to resource loading, operation, administration and maintenance. The timers and triggers (i.e., the determination of when the periodic reports are generated) are controlled within the BS 15 and MSC 25 (i.e., the periodic message processor 230 decodes the communication to determine the periodic messages and sends them to the report generator 240 to be reported). Similar to the state machine unit 220, the periodic message processor 230 may provide parsed data to be formatted as a report from the protocol decoder 210 to the report generator 240.

In an exemplary embodiment of the present invention, the wireless network explorer 30 may store the information generated by the state machine unit 220, the event based reporting unit 225 and the periodic message processor 230 in an index entry within a database 250. Any type of class, quantifier, metric, etc. . . . , associated with the call may be stored in the index entry. An example of information stored in the index entry may include, but is not limited to, a unique identifier of a mobile station (e.g., MIN/ESN), a service option of the mobile station (e.g., Rate Set-1 EVRC Voice, Rate-Set 2 Voice, 3G IP, 3G CDPD, etc. . . . ), an identifier of the BS 15 that supports the mobile station, and/or 3G1x data call configuration settings (e.g., Channel Coder Type (Turbo/Convolution), RLP Type, MUX Type, QOS level, QOS Class, etc. . . . ). Further, the index entry may include any of the elements described above with respect to the state machine unit 220 in any of tables 1, 2, 3 and 4.

Further, as described above, the index entry may contain a time stamp (e.g., for a given call characteristic/event stored in the index entry, an associated time stamp is stored, the time of the time stamp being the time associated for the given call characteristic and not the time of recording the index entry). By having call characteristics stored in the index entry with an associated time stamp for the call, temporal correlations between events may be determined. It will be appreciated that it may be possible to prepare a time correlated analysis of a communication system without the requirement of real-time processing.

In another exemplary embodiment of the present invention, the communication which the wireless network explorer 30 receives, records and/or analyzes may include existing messages on conventional wireless networks which are required for managing a user call and/or to handle traffic load.

In another exemplary embodiment of the present invention, the communication which the wireless network explorer 30 receives, records and/or analyzes may include messages not required by the communications network. In other words, messaging which serves to support an analysis required by the wireless network explorer 30 may be used. For example, additional data (i.e., data not required to handle communication on the wireless network 50) may be generated at one or more network elements (e.g., BS, MSC, etc. . . . ). The additional data may be discarded by the receiving network element (i.e., the unnecessary data is not required at the receiving network element, but is rather intended for analysis at the wireless network explorer 30). The wireless network explorer 30 may receive the additional data and record and/or analyze the additional data similar to operations described above with respect to existing data communications.

The database 250 may store results in index entries based on a per-call basis. For example, the unique identifier (e.g. Electronic Serial Number (ESN)) of a mobile station may act as the primary key and the cell or MSC 25 may act as the secondary key. The primary key is an attribute or a set of attributes that uniquely identifies a specific instance of an entity. The entity may include any element related to the communication network (e.g., a call, a wireless call, a trigger, a BS, an MSC, etc. . . . ). The primary key may be used to identify and/or access its associated entity from within the database 250. In order to qualify as a primary key for an entity, the attribute must include the following properties:

1) a non-null value for each instance of the entity
2) the value must be unique for each instance of an entity
3) the value must not change or become null during the life of each entity instance.

More than one attribute may be required to uniquely identify an entity. A primary key that is made up of more than one attribute is known as a secondary key or composite key. Secondary key indices are those used to access a database other than the primary key.

Based on the stored index entries in database 250, a feature extractor 260 may determine an aggregation (i.e., accumulation) over many calls based on call characteristics that may include, but are not limited to, cell site, carrier, sector, radio configuration, signature of the hardware element handling the call, service options, hand-off ratio, mobility class and call failure code. For each category of call characteristics, it may be possible to obtain statistics such as an average and/or distribution of parameters including, but not limited to, Frame Error Rate (FER), resource usage such as walsh code usage, transmitted power, mobile location and propagation loss analysis, backhaul bandwidth and BS/MSC hardware/processor usage, forward transmitted gain in Radio-Config-1, voice traffic type, selected leg, SCH performance, RLP performance, geo-location, propagation loss and hand-off overhead (i.e., inter-BS messaging delays).

A mobile location and propagation loss analysis may be performed based on the accumulated information of the wireless network explorer 30. Any well-known mobile location and propagation loss algorithm (e.g., such as used conventionally with data acquired from drive testing) may be applied to the accumulated data. In contrast, conventional methods of performing mobile location and propagation loss analysis require drive testing (i.e., a physical presence in the range of a base station, such as in a vehicle with testing equipment). Thus, by enabling mobile location and propagation loss analysis from the wireless network explorer 30, mobile location and propagation loss analysis becomes faster (i.e., location data may be accessed more quickly through the database 250), cheaper (i.e., drive testing requires expensive equipment and many man-hours), and more accurate (i.e., drive testing provides limited amounts of data for mobile location and propagation loss analysis).

The feature extractor 260 may also give results on a per-call basis (e.g., results on a single user ID throughout the call span for as long as the user remains within the footprint of the base stations being monitored may be provided). Alternatively, the feature extractor 260 may give results on a per-user basis (i.e., the calls may be sorted by the ID associated with a given mobile), time based (i.e., the results may be sorted by the time the data was recorded), or may be sorted by any other element queried by the feature extractor 260. The wireless network explorer 30 may be configured to simultaneously monitor a plurality of BSs 15 on a same frequency carrier. Once the index table is created for the calls handled by the BSs 15, the feature extractor 260 may obtain statistics for those calls whose ESN has spanned multiple BSs 15 (i.e., mobile stations whose calls entered soft handoff). Chronological ordering may enable the trace of the call throughout the region of the monitored BSs to be determined. The wireless network explorer 30 may also be configured to provide different classes of performance metrics (e.g., the performance metrics described above with respect to the state machine unit 220) for different BSs 15 that are monitored.

The feature extractor 260 may include software which may query the database 250 relating to various stored elements in the index entries. For example, the feature extractor 260 may identify a call failure, determine the traffic type of the call related to the call failure, and extract the hand-off matrix and/or hand-off triggers of the call related to the call failure.

The results of the feature extractor 260 may be sent to a peripheral device 265, for example a network printer and/or a storage device. The results of the feature extractor 260 may also be displayed on a display 270, for example a computer monitor, for viewing by a user. Further, the wireless network explorer 30 may include a user interface 275. The user interface 275 allows a user to select features which the feature extractor 260 may extract and analyze. For example, the user interface 275 may allow a user to define the queries used by the feature extractor 260. The user interface 275 may be a remote computer terminal and/or a local computer terminal. Further, the user interface 275 may be a Graphical User Interface (GUI) or other type of user interface. The results of the feature extractor 260 may also be sent to a remotely located external system 280.

In another exemplary embodiment of the present invention, the above described database 250 may be created and accessed through any well-known database structure. For example, the database 250 may be an object oriented database and well-known object oriented data base techniques such as established by the queries may be used by the feature extractor 260 on the database 250.

An example of call data queried by the feature extractor 260 will now be described in detail. It is understood that the specific data queried is meant for example purposes only, and that additional types of data may also be queried by the feature extractor 260.

FIG. 4 illustrates an example of data queried and organized by the feature extractor 260. The elements listed as column headers in FIG. 4 are defined in Table 5 below. The values associated with the elements in FIG. 4 are given as integers, state names, decimals and/or hexadecimal numbers (e.g., hexadecimal numbers begin with "0x" followed by the number).

The elements illustrated in FIG. 4 and listed below in Table 5 are examples only, and do not represent a complete listing of all possible elements that may be queried by the feature extractor 260. For example, additional elements may include, but are not limited to, handoff triggers, handoff matrices, call flow states, etc. . . .

TABLE 5

| Element | Definition |
| --- | --- |
| CallSummary# | Index Number. |
| CCU and CE | The CCU and the CE are the signature of the hardware element handling the call segment at the BS. The CCU and the CE may be displayed in hexadecimal. |
| CALLID | This is the Identification Number assigned by the MSC to every call segment that the BS handles. It is unique for this call segment. The CALLID may be displayed as a hexadecimal number. |
| IncomingState | The IncomingState indicates whether the call originated in this BS (i.e., via NOT_A_HANDOFF), or whether it was a soft handoff (i.e., via SOFT_HANDOFF), semi-soft handoff (i.e., via SEMI_SOFT_HANDOFF) or hard handoff (= HARD_HANDOFF). |
| EndingState | The EndingState indicates whether the call ended normally in this BS (i.e., via NOT_A_HANDOFF) or was primary transferred to some other cell site (i.e., via PRIMARY_TRANSFER) or semi-soft hand off (i.e., via SEMI_SOFT_HANDOFF) or hard handoff (HARD_HANDOFF). |
| InitialPath | The InitialPath indicates the sector in which the call was initially picked up in this BS. Referring to FIG. 4, "0" indicates an Alpha sector, "1" indicates a Beta sector and "2" indicates a Gamma sector. |
| ESN | The electronic serial number for the mobile. The ESN may be given in hexadecimal notation. |
| ServiceOptionRequested | A service option requested by the mobile. See Table 6 below for more details. |

TABLE 5-continued

| Element | Definition |
| --- | --- |
| ServiceOptionAssigned | A service option assigned by the mobile. See Table 6 below for more details. |
| FwdRadioCfg | The forward radio configuration (e.g., this indicates whether the call is 2G, 3G, etc . . . ). See Table 7 below for more details. |
| ReleaseReason | The reason the call was released or terminated. See Table 8 below for more details. |
| CallSegmentStartTime_sec | Time at which the call was picked up by this base station. The timestamp is given in seconds from the time the logging session was started (i.e., the time stamp is relative and not absolute). For e.g, if the log session begins at 9:00am and the call started at 9:05 am, the CallSegmentStartTime_sec would be 300 seconds (i.e., 5 minutes). |
| CallSegmentEndTime_sec | Time at which the call segment ended its association with the monitored base station. The ending state may be an end of a normal call. a hand over to another base station and/or a call failure. The timestamp is recorded in seconds from the start of the logging session (i.e., the time stamp is relative and not absolute). |
| TotalCallSegmentDuration_sec | This is the result of an expression (i.e., CallSegmentEndTime_sec − CallSegmentStartTime_sec). (See above elements). |

Table 6 defines the service options (i.e., ServiceOptionRequested and/or ServiceOptionAssigned as defined in Table 5 and illustrated in FIG. 4) associated with a given hexadecimal number.

TABLE 6

| Value | Acronym | Description |
| --- | --- | --- |
| 0x3 | EVRC | Enhanced Variable Rate Codec |
| 0x38 | SMV | Selectable Mode Vocoder |
| 0x6 | SMS | Short Message Service |
| 0xE | 13KSMS | Short Message Service - 13K |
| 0x12 | 8KOTAPA | Over The Air Provisioning 8K |
| 0x13 | 13KOTAPA | Over The Air Provisioning 13K |
| 0x8000 | 13KVOICE | Voice - 13K |
| 0x801E | 8KMARKOV | Markov Test Call - 8K |
| 0x801F | 13KMARKOV | Markov Test Call - 13K |
| 0x11 | S13KVOICE | Standard 13K voice service |
| 0x4 | 8KCDATA | Async data service (9.6 kbps) |
| 0x5 | 8KCFAX | Group 3 Facsimile (9.6 kbps) |
| 0xc | 13KCDATA | Async data service (14.4 kbps) |
| 0xd | 13KCFAX | Group 3 Facsimile (14.4 kbps) |
| 0x7 | 9IP | packet data 9.6 IP service |
| 0x8 | 9CDPD | packet data 9.6 CDPD service |
| 0xf | 14IP | packet data 14.4 IP service |
| 0x10 | 14CDPD | packet data 14.4 CDPD service |
| 0x14 | 8KAFAX | Analog Fax Rate Set 1(9.6 kbps) |
| 0x15 | 13KAFAX | Analog Fax Rate Set 2(14.4 kbps) |
| 0x1007 | 9IP_V1 | 9.6 IP service, version 1 |
| 0x1008 | 9CDPD_V1 | 9.6 CDPD service, version 1 |
| 0x16 | 2GPKTSO22 | IS95B packet data SO22 service |
| 0x17 | 2GPKTSO23 | IS95B packet data SO23 service |
| 0x18 | 2GPKTSO24 | IS95B packet data SO24 service |
| 0x19 | 2GPKTSO25 | IS95B packet data SO25 service |
| 0x2a | 2GPKTSO26 | IS95B packet data SO26 service |
| 0x1b | 2GPKTSO27 | IS95B packet data SO27 service |
| 0x1c | 2GPKTSO28 | IS95B packet data SO28 service |
| 0x1d | 2GPKTSO29 | IS95B packet data SO29 service |
| 0x21 | 3GIP | packet data 3G-1X IP service |
| 0x22 | 3GCDPD | packet data 3G-1X CDPD service |
| 0x23 | 8KGEO | Rate set 1 for Location Services |
| 0x24 | 13KGEO | Rate set 2 for Location Services |

Table 7 defines the forward radio configuration associated with a given hexadecimal number as illustrated in FIG. 4.

| FwdRadioCfg | Meaning |
| --- | --- |
| 1 | 2G RC for rate set 1 (8K) |
| 2 | 2G RC for rate set 2 (13K) |
| 3 | 3G RC for rate set 1 (8K) |
| 4 | 3G RC for forward rate set 1 (8K) 3G RC for reverse rate set 2 (13k) |
| 5 | 3G RC for rate set 2 (13K) |

Table 8 defines the reason that a call was released or terminated.

| Value | Release reason (i.e., cause) |
| --- | --- |
| 0 | Normal Release |
| 1 | Loss of MSC's Speech Handler Continuity |
| 2 | Loss of Mobile traffic - LOST CALL |
| 3 | Service Option Rejected |

The exemplary embodiments of the present invention being thus described, it will be obvious that the same may be varied in many ways. For example, the wireless network explorer 30 may be applied to a 2G, 3G, 3G1X, 3G3X, EVDO, EVDV, UMTS and/or other protocol for a wireless network. The wireless network explorer 30 may summarize typical user behavior, throughput, delay, and timeouts and may quantify general system constraints affecting the performance of the communication network.

Further, above-described applications for the wireless network explorer 30 have generally been directed to a CDMA2000 cellular network. However, the wireless network explorer 30 is applicable to any type of wireless network (e.g., cellular, 802.11b, 802.11a, 802.11g, VOIP, Bluetooth, RF, etc. . . . ). Thus, while the term "BS" has been above described to indicate a base station in a wireless network, it is understood that the BS may also indicate a NodeB (e.g., UMTS) and/or other wireless emitters/receivers (e.g., as included in 802.11b, 802.11a, 802.11g, Bluetooth, RF, etc. . . . ) that may be connected to the wireless network.

Further, above-described exemplary embodiments describe a monitoring of communications between a BS and an MSC. However, the wireless network explorer 30 may monitor communication at any point within the wireless communications network (e.g., R-P, $A_{bis}$, A3, A7, SS7, $I_u$, $I_{ub}$, $I_{ur}$, $G_b$, $G_n$, $G_i$, etc. . . . ).

Further, the above-described state machine unit 220 has been described generally with regard to 3G voice communications. However, the state machine unit 220 may be configured for any type of wireless standard (e.g., 2G, 3G, 3G1X, 3G3X, 4G, EVDO, EVDV, UMTS, etc. . . . ) as well as voice, data, facsimile, etc. . . .

Further, link protocols have been above-described as either T1 or E1. However, any link protocol may be used (e.g., IP, VoIP, etc. . . . ). Also, the link transceiver T1 may be implemented as any type of transceiver (e.g., an Ethernet transceiver, etc. . . . ).

Further, above-described embodiments are directed to a centralized network architecture. However, any type of network architecture (e.g., a flat architecture used in a base station router (BSR), etc. . . . ) may be included for monitoring with the wireless network explorer 30. The BSR may include the functionality of several network elements (e.g., BS, RNC, SGSN, GGSN or PDSN, etc. . . . ) within a collapsed mobile network architecture. The BSR may directly connect to an IP network (e.g., via an edge router, a serial connection, etc. . . . ). Thus, the wireless network explorer may be connected to monitor BSR messaging on the backhaul or on the IP network at any location where communication between the BSR and the IP network may be intercepted.

Further, flat architectures are not limited to a BSR. Thus, the wireless network explorer may be applied to any type of network including a flat architecture (e.g., a network not including a BSR).

Further, the above-described MSC has been generally described with respect to a 3G-1X protocol. However, the MSC may also include a base station controller (BSC), a radio network controller (RNC), and/or a selection and distribution unit (SDU).

Further, mobility metrics (e.g., above-described anchor activity with respect to 3G-X1, etc. . . . ) that directly affect the SCH (i.e., data activity) may be monitored by the wireless network explorer 30.

Such variations are not to be regarded as a departure from the spirit and scope of the exemplary embodiments of the invention, and all such modifications as would be obvious to one skilled in the art are intended to be included within the scope of the present invention.

We claim:

1. A method for monitoring communication in a wireless communication network, comprising:
    monitoring, at a network element configured to provide wireless voice and data communications in the wireless communication network, communication between the network element and one or more mobile stations in the wireless communication network without affecting performance of the monitored communication, the communication being monitored on a per call basis;
    parsing data associated with the monitored communication into a plurality of call event messages each including a message type indicating at least one of a hand off trigger, a supplemental channel (SCH) characteristic, and an anchor characteristic;
    storing the plurality of call event messages; and
    performing an analysis on the stored call event messages by the network element, the analysis being based on the message type.

2. The method of claim 1, wherein the monitoring step monitors communication at the network element and the network element is associated with at least one base station.

3. The method of claim 2, wherein the network element includes at least one of a Mobile Switching Center, a Radio Network Controller, a Selection and Distribution Unit, a Base Station Controller, and a Packet Control Function.

4. The method of claim 1, wherein the monitoring step monitors at least one of communication over a backhaul of the wireless communication network and monitoring communication over a chassis backplane of a network element.

5. The method of claim 1, wherein the communication includes at least one of a signal between a base station and a mobile switch center and between a base station and a mobile station.

6. The method of claim 1, wherein the storing step stores messages on a call-by-call basis.

7. The method of claim 6, wherein the storing step stores a timestamp in association with the stored messages to indicate when the monitored communication associated with the data occurred.

8. The method of claim 6, wherein the messages for a call includes a location of a mobile station involved in the call.

9. The method of claim 1, wherein the stored messages are associated with at least one of a control message, a header of a traffic frames, an inter-base station soft-handoff control messages, a reverse mobile signaling message during soft-handoff and forward mobile signaling messages.

10. The method of claim 1, wherein the SCH characteristic includes at least one of a supplemental channel setup, a supplemental channel denial, a supplemental channel abort, and a supplemental channel release.

11. The method of claim 1, wherein the anchor characteristic includes at least one of an anchor setup, an anchor release and an anchor transfer.

12. The method of claim 1, wherein the call event includes at least one of a normal end of a call, a call failure, and a handoff state change.

13. The method of claim 1, wherein the storing step stores data associated with the messages on a periodic basis.

14. The method of claim 13, wherein the periodic data is based on communication between a base station and a mobile switching center.

15. The method of claim 13, wherein the periodic data relates to at least one of resource loading, operation, administration and maintenance.

16. The method of claim 1, wherein the analysis includes aggregating a portion of the stored messages over time.

17. The method of claim 16, wherein the analysis includes mobile location and propagation loss analysis.

18. The method of claim 16, wherein the analysis includes a temporal correlation.

19. The method of claim 16, wherein the analysis is performed on a per-call basis.

20. The method of claim 16, wherein the analysis is performed on a time basis.

21. The method of claim 16, wherein the analysis is performed on a user basis.

22. The method of claim 1, wherein the wireless communication network includes at least one of Second Generation (2G), Third Generation (3G), Third-Generation, 144 kbps Wireless Technology (3G-1X), Fourth Generation (4G), Evolution-Data Optimized (EV-DO), Evolution-Data/Voice (EV- DV), Universal Mobile Telecommunications System (UMTS), and High-Speed Downlink Packet Access (HSDPA).

23. The method of claim 1, wherein the wireless communication network includes at least one of 802.11b, 802.11a, 802.11g, Bluetooth and RF.

24. The method of claim 1, wherein the wireless communication network includes an architecture being one of a flat architecture, a centralized architecture, and a combination of a flat architecture and a centralized architecture.

25. The method of claim 24, wherein the centralized architecture includes an mobile switching center and a base station.

26. The method of claim 24, wherein the flat architecture includes a base station router.

27. An apparatus for monitoring communication in a wireless communication network, comprising:
 a network explorer connected to the wireless communication network, the network explorer configured to,
  monitor communication between a network element configured to provide wireless voice and data communications in the wireless communication network and one or more mobile stations in the wireless communication network without affecting the performance of the monitored communication, the communication being monitored on a per call basis,
  parsing data associated with the monitored communication into a plurality of call event messages each including a message type indicating at least one of a hand off trigger, a supplemental channel (SCH) characteristic, and an anchor characteristic,
  store the plurality of call event messages, and
  perform an analysis on the stored call event messages, the analysis being based on the message type.

28. The apparatus of claim 27, wherein the network explorer comprises:
 a data parser for parsing messages in the monitored communication; and
 a state-machine unit establishing a state-machine to monitor each call, each state-machine including states associated with states of a call, and each state-machine storing data in at least one of the state-machine states.

29. The apparatus of claim 28, wherein the network explorer further comprises:
 a feature extractor performing the analysis on the stored messages.

* * * * *